US012782909B2

(12) United States Patent
Gomi et al.

(10) Patent No.: US 12,782,909 B2
(45) Date of Patent: Nov. 3, 2026

(54) CONTROL DEVICE FOR INDUSTRIAL MACHINE

(71) Applicant: FANUC CORPORATION, Minamitsuru-gun (JP)

(72) Inventors: Shunichi Gomi, Minamitsuru-gun (JP); Makoto Haga, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 18/839,137

(22) PCT Filed: Mar. 4, 2022

(86) PCT No.: PCT/JP2022/009312
§ 371 (c)(1),
(2) Date: Aug. 16, 2024

(87) PCT Pub. No.: WO2023/166691
PCT Pub. Date: Sep. 7, 2023

(65) Prior Publication Data
US 2025/0164964 A1 May 22, 2025

(51) Int. Cl.
*G05B 19/406* (2006.01)

(52) U.S. Cl.
CPC .. *G05B 19/406* (2013.01); *G05B 2219/34256* (2013.01)

(58) Field of Classification Search
None
See application file for complete search history.

(56) References Cited

U.S. PATENT DOCUMENTS 6,408,366 B1 6/2002 Lorenz et al.
2023/0330856 A1* 10/2023 Yoneyama ............ B25J 9/1664

FOREIGN PATENT DOCUMENTS

| | | |
|---|---|---|
| JP | 8-69311 | 3/1996 |
| JP | 2012-96338 | 5/2012 |
| JP | 2017-217734 | 12/2017 |
| JP | 2019-169092 | 10/2019 |

OTHER PUBLICATIONS

International Search Report issued May 17, 2022 in International Application No. PCT/JP2022/009312.

* cited by examiner

*Primary Examiner* — Sean Shechtman
(74) *Attorney, Agent, or Firm* — Wenderoth, Lind & Ponack, L.L.P.

(57) ABSTRACT

A control device for an industrial machine includes a data storage unit that stores data to be used for operation, a saved data storage unit that stores data not to be used for operation, and a control unit including an operation start detection unit that detects start of operation of a machining process, a data saving unit that saves data stored in the data storage unit to the saved data storage unit, and an operation status acquisition unit that acquires an operation status. The control unit saves data to the saved data storage unit to obtain an increased number of access destinations, namely, the data storage unit and the saved data storage unit before start of operation of the machining process, and suppresses the operation and the API or the APIs from simultaneously accessing the same data during the operation.

6 Claims, 3 Drawing Sheets

CONTROL DEVICE FOR INDUSTRIAL MACHINE

TECHNICAL FIELD

The present invention relates to a control device for industrial machine.

BACKGROUND ART

Along with the development of the internet of things (IoT), more users use an application programming interface (API) to back up data in a control device for an industrial machine, such as a machine tool, a robot, etc.

For example, according to a known technique relating to robot control devices, when a program read command that commands reading a stored program is received from an externally connected device, a device ID identifying the externally connected device as the destination of reading and date-and-time information indicating the time of reading are added to the program, and the program is then backed up. At this time, if there is a program with a device ID that matches the foregoing device ID, the date-and-time information and the program are updated, and backed up, and if there is no program with a matching device ID, the program is backed up, whereby the known technique can effectively prevent loss of contents of correction of the stored programs. See, for example, Patent Document 1.

CITATION LIST

Patent Document

Patent Document 1: Japanese Unexamined Patent Application, Publication No. 2017-217734

DISCLOSURE OF THE INVENTION

Problems to be Solved by the Invention

In a case where the technique of Patent Document 1 is applied to a system that prohibits APIs from simultaneously accessing the same data in order to maintain the data integrity, execution of an API for backup that occupies data for a relatively long time disadvantageously makes another API that is to access the same data wait for a long time.

In addition, if an API for backup accesses and occupies data, access to which is necessary during operation such as machining by an industrial machine, for a long time, there is a possibility that an API for performing a data change necessary for the operation is made to wait, which may deteriorate the cycle time or stop the operation.

Since a factory where industrial machines are installed is in a severe environment in which considerable noises and vibrations are generated by the industrial machines, it may be difficult to use a memory or the like having a large storage capacity for backup.

Under the circumstances described above, it is desired to suppress an access conflict between an API that occupies data for a relatively long time and another API while machining or the like by an industrial machine is in operation, and to reduce an influence of the API that occupies data for a relatively long time on the operation of the industrial machine.

Means for Solving the Problems

An aspect of the present disclosure is directed to a control device for an industrial machine, the control device being adapted for data access via an API, and including: a data storage unit configured to store data for use for operation; a save-and-storage unit configured to store data not for use for operation; and a control unit. The control unit includes an operation start detection unit configured to detect a start of operation for machining for the industrial machine, a data saving unit configured to cause data stored in the data storage unit to be saved in the save-and-storage unit, and an operation status acquisition unit configured to acquire an operation status of the control device. The control device saves data in the save-and-storage unit before the start of the operation for machining to thereby increase a number of access destinations to two including the data storage unit and the save-and-storage unit, and makes it less likely for the operation and the API or at least two APIs to simultaneously access same data while the machining is in operation.

Effects of the Invention

The aspect makes it possible to suppress an access conflict between an API that occupies data for a relatively long time and another API while machining or the like by the industrial machine is in operation, and to reduce an influence of the API that occupies data for a relatively long time on the operation of the industrial machine,

PREFERRED MODE FOR CARRYING OUT THE INVENTION

One Embodiment

Figure 1:
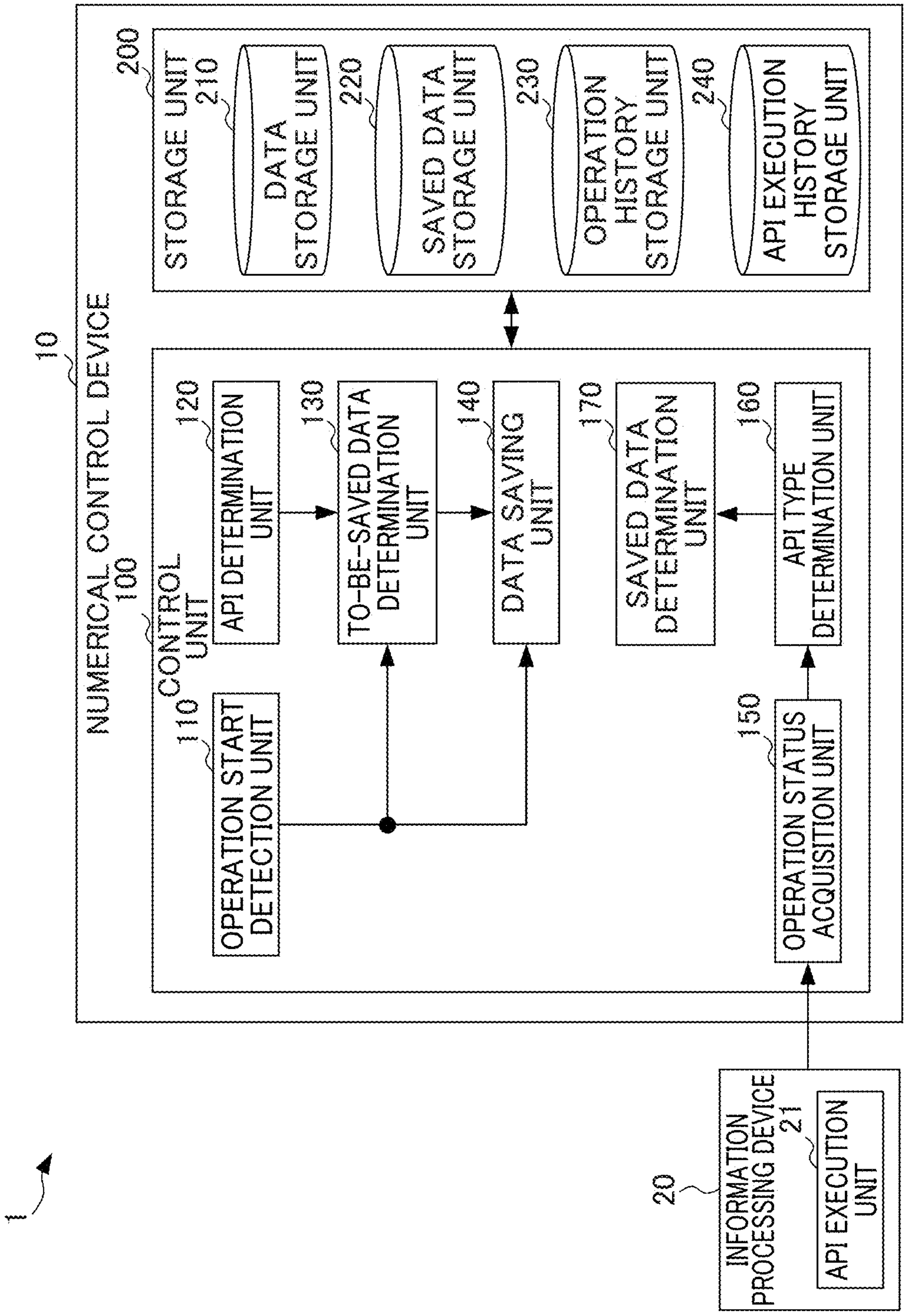
FIG. 1 is a functional block diagram illustrating a functional configuration example of a control system according to an embodiment.

FIG. 1 is a functional block diagram illustrating a functional configuration example of a control system according to one embodiment. Here, as a control device for an industrial machine, a numerical control device that controls a machine tool (not shown) is exemplified. It should be noted that the present invention is not limited to the numerical control device, and is applicable to a robot control device that controls a robot.

In the following description, data that the numerical control device accesses for the purpose of machining may be referred to as "data for use for operation", and data that the numerical control device accesses for a purpose different from the machining may be referred to as "data not for use for operation".

As illustrated in FIG. 1, the control system 1 includes a numerical control device 10 and an information processing device 20 as an external device. The numerical control device 10 and the information processing device 20 may be directly connected to each other via a connection interface (not shown). The connection between the numerical control device 10 and the information processing device 20 may be established via a network (not shown) such as a local area network (LAN) or the Internet. In this case, the numerical control device 10 and the information processing device 20 each include a communication unit (not shown) for communicating with each other through the connection.

In the control system 1 illustrated in FIG. 1, one information processing device 20 is connected to the numerical control device 10. However, as will be described later, two or more information processing devices 20 may be connected to the numerical control device 10.

Information Processing Device 20

The information processing device 20 is a computer, a smartphone, a tablet terminal, or the like, and functions as an API execution unit 21 when a processor such as a central processing unit (CPU) included in the information processing device 20 executes an application program.

The API execution unit 21 executes an API that backs up data stored in the numerical control device 10, which will be described later, an API that updates the values of parameters set in the numerical control device 10, and other APIs, based on instructions from a user of the information processing device 20 or a preset time.

Numerical Control Device 10

The numerical control device 10 is a numerical control device known to those skilled in the art, generates commands based on a machining program, and transmits the generated commands to a machine tool (not shown). In this way, the numerical control device 10 controls the motion of the machine tool (not shown).

As illustrated in FIG. 1, the numerical control device 10 includes a control unit 100 and a storage unit 200. The control unit 100 includes an operation start detection unit 110, an API determination unit 120, a to-be-saved data determination unit 130, a data saving unit 140, an operation status acquisition unit 150, an API type determination unit 160, and a saved data determination unit 170.

Storage Unit 200

The storage unit 200 includes a solid state drive (SSD), a hard disk drive (HDD), or the like. The storage unit 200 stores information regarding types of APIs as well as an operating system, an application program, and the like that are executed by the control unit 100, which will be described later.

The storage unit 200 includes, for example, a data storage unit 210, a saved data storage unit 220 functioning as a save-and-storage unit, an operation history storage unit 230, and an API execution history storage unit 240.

The data storage unit 210 stores, for example, parameters (for example, servo parameters for each machining step) set for the numerical control device 10 and data for use for operation, such as tool offsets, machining programs, etc.

As will be described later, when the numerical control device 10 starts an operation of the machine tool (not shown) for machining, the saved data storage unit 220 stores, from among the data stored in the data storage unit 210, the data not for use for operation (data that is accessed for a purpose different from machining) which is saved by means of the data saving unit 140.

The operation history storage unit 230 stores data indicating an operation history, such as machining that was performed by the machine tool (not shown) in the past. Specifically, the operation history storage unit 230 stores operation history data including the name of an executed machining program, the execution start time and the execution end time of the machining program, and the like, in the following description form, for example: "01000: operation start 2021 Dec. 23 19:30 operation end 2021 Dec. 23 20:30".

The API execution history storage unit 240 stores data indicating an execution history of APIs that were executed by the information processing device 20 and that accessed the numerical control device in the past. Specifically, the API execution history storage unit 240 stores API execution history data including the type of an API that was executed and that accessed the numerical control device, the execution start time and the execution end time of the API, and the like, in the following description form, for example: "Parameter backup: execution start 2021 Dec. 23 20:00 execution end 2021 Dec. 23 20:01".

Control Unit 100

The control unit 100 includes a CPU, a ROM, a RAM, a CMOS memory, and the like, which are configured to communicate with each other via a bus, and is known to those skilled in the art.

The CPU is a processor that controls the numerical control device 10 in its entirety. The CPU reads a system program and an application program stored in the ROM via the bus, and controls the entire numerical control device 10 in accordance with the system program and the application program. Thus, as illustrated in FIG. 1, the control unit 100 is configured to fulfill the functions of the operation start detection unit 110, the API determination unit 120, the to-be-saved data determination unit 130, the data saving unit 140, the operation status acquisition unit 150, the API type determination unit 160, and the saved data determination unit 170. The RAM stores various data such as temporary calculation data and display data. The CMOS memory is backed up by a battery (not shown), and is configured as a nonvolatile memory that maintains its storing state even when the numerical control device 10 is turned off.

The operation start detection unit 110 detects a start of operation for machining (cycle start) for the machine tool (not shown), upon reception of a machining execution command inputted by an operator via an input unit (not shown) such as a keyboard or a touch panel included in the numerical control device 10, for example.

The API determination unit 120 determines the types of APIs that were executed by the information processing device 20 and that accessed the numerical control device while past machining was in operation, based on the operation history stored in the operation history storage unit 230 and the API execution history stored in the API execution history storage unit 240.

Specifically, for example, in a case where parameters, tool offsets, and the like of the numerical control device 10 were backed up by an API that was executed by the information processing device 20 and that accessed the numerical control device while past machining was in operation, the API determination unit 120 determines the API to be an API for backup. Alternatively, in a case where the parameters, the tool offsets, and the like of the numerical control device 10 were accessed (e.g., referenced to or changed) by an API that was executed by the information processing device 20 and that accessed the numerical control device while past machining was in operation, the API determination unit 120 determines the API to be an API for parameter access.

The to-be-saved data determination unit 130 determines, from among data stored in the data storage unit 210, data that is to be saved in the saved data storage unit 220 by the data saving unit 140, which will be described later, based on a result of determination by the API determination unit 120 or a designation inputted by the operator via the input unit (not shown) of the numerical control device 10, Specifically, for example, at a timing when the operation start detection unit 110 detects a start of operation, the to-be-saved data determination unit 130 selects and determines data to be backed up by an API for backup that has been determined by the API determination unit 120, as data not for use for operation that is to be saved in the saved data storage unit 220.

The data saving unit 140 causes data stored in the data storage unit 210 to be saved in the saved data storage unit 220.

Specifically, for example, before a start of operation for machining, the data saving unit 140 causes data satisfying a predetermined condition to be saved in the saved data storage unit 220.

Here, according to the predetermined condition, data such as a parameter or a tool offset that is accessed by an API for backup may be set as a saving target, from among the data stored in the data storage unit 210. Alternatively, according to the predetermined condition, data not for use for operation may be set as a saving target. Alternatively, according to the predetermined condition, data that is accessed for a purpose different from machining may be set as a saving target. Alternatively, according to the predetermined condition, data arbitrarily set by a user may be set as a saving target.

Alternatively, according to the predetermined condition, at least one of the above-described data or a combination of at least two of the above-described data may be set as a saving target.

In a case where the saved data storage unit 220 does not have a sufficient free space, the data saving unit 140 may preferentially cause the data determined by the to-be-saved data determination unit 130 to be saved in the saved data storage unit 220.

The operation status acquisition unit 150 acquires an operation status of the numerical control device 10 at, for example, a timing when an API that is currently executed by the information processing device 20 accesses the numerical control device.

The API type determination unit 160 determines the type of the API that is currently executed by the information processing device 20 and accesses the numerical control device, based on, for example, information regarding the types of APIs stored in advance in the storage unit 200.

In this way, the numerical control device 10 can determine whether the data in the data storage unit 210 or the data in the saved data storage unit 220 is to be accessed by the API that is currently executed by the information processing device 20 and accesses the numerical control device, according to the type of the API.

For example, in a case where the information processing device 20 is currently executing an API that performs processing (e.g., backup, etc.) unrelated to the operation for machining, the saved data determination unit 170 determines whether data to be accessed by the API exists in the saved data storage unit 220. When the data to be accessed by the API exists in the saved data storage unit 220, the saved data determination unit 170 causes the API to access the saved data storage unit 220, whereas when the data to be accessed by the API does not exist in the saved data storage unit 220, the saved data determination unit 170 causes the API to access the data storage unit 210.

API Processing by Numerical Control Device 10

Next, a flow of API processing by the numerical control device 10 will be described with reference to FIGS. 2 and 3.

Figure 2:
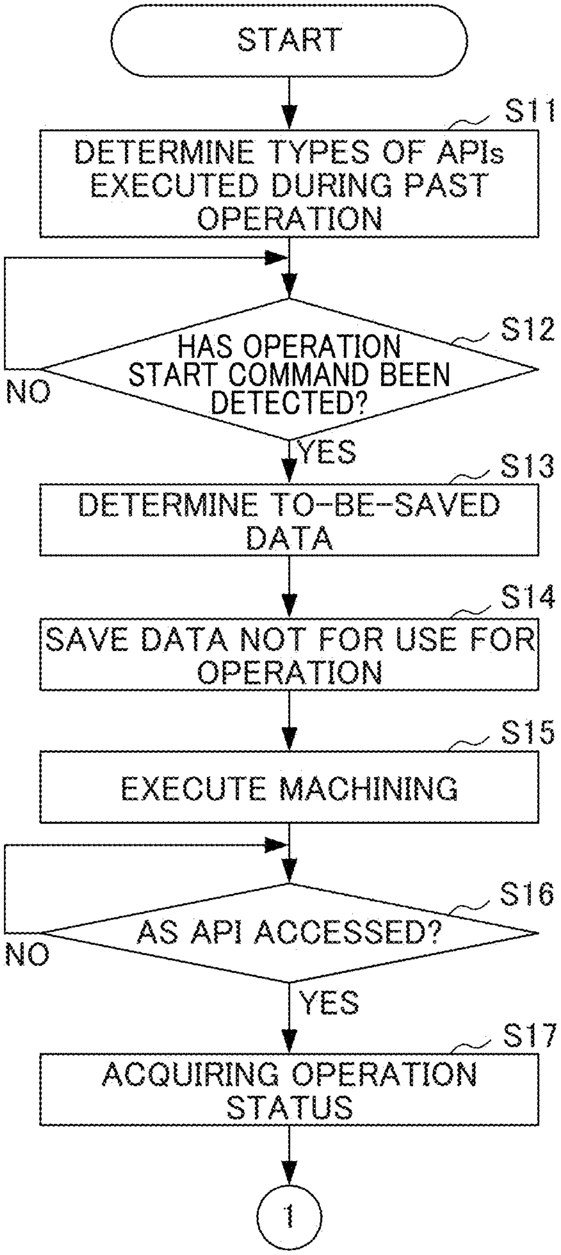
FIG. 2 is a flowchart illustrating API processing by a numerical control device.
Figure 3:
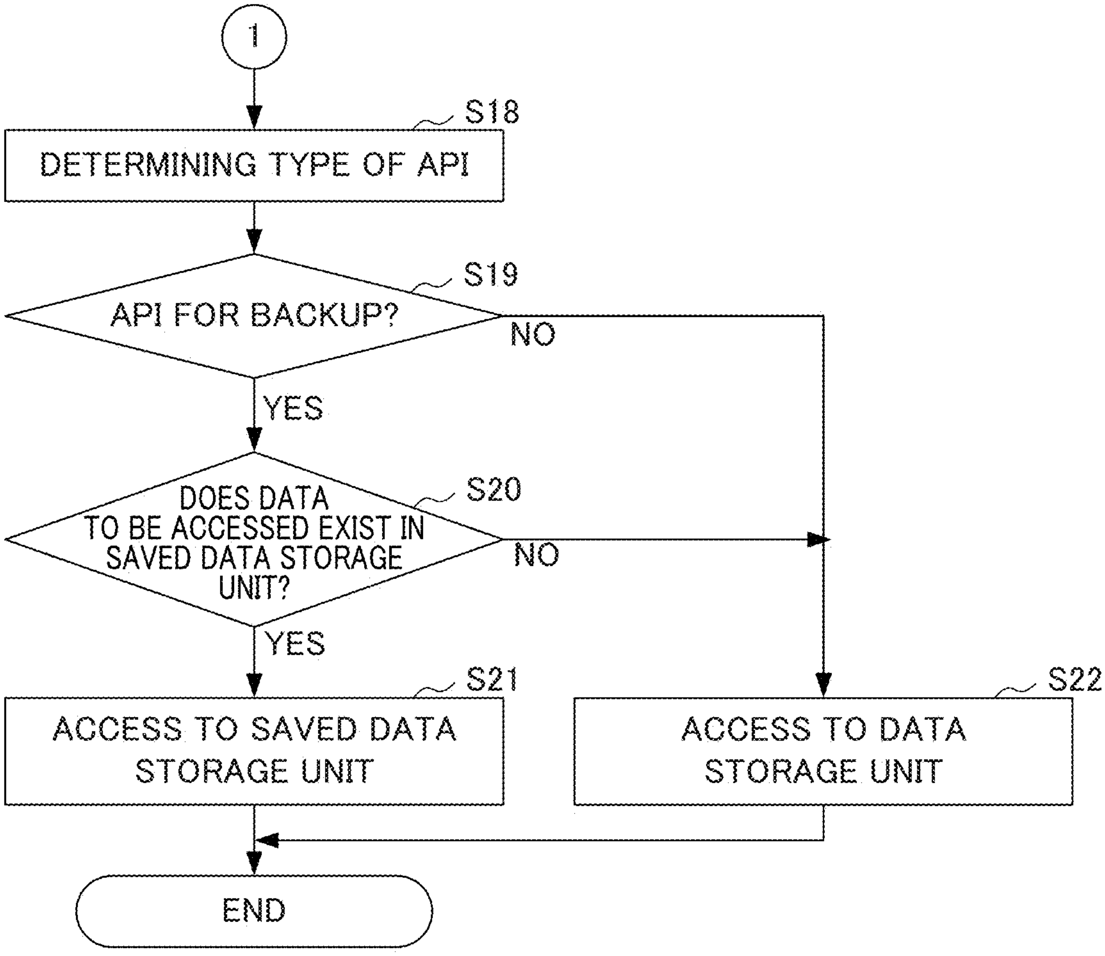
FIG. 3 is a flowchart illustrating the API processing by the numerical control device.

FIGS. 2 and 3 are flowcharts illustrating the API processing by the numerical control device 10, The flow described here is repeatedly executed every time the operator instructs a start of operation for machining.

Hereinafter, the following cases are described: a case in which the API execution unit 21 of the information processing device 20 executes an API for parameter backup that backs up the parameters, the tool offsets, and the like set in the numerical control device; and a case in which the API execution unit 21 of the information processing device 20 executes an API for parameter access that accesses (e.g., references to or changes) the parameters, the tool offsets, and the like set in the numerical control device 10 while the machining is in operation. However, the same flow applies to other APIs such as an API for program backup, an API for program editing, etc. other than the API for parameter backup and the API for parameter access.

In Step S11, the API determination unit 120 determines the types of APIs that were executed by the information processing device 20 and that accessed the numerical control device while past machining was in operation, based on the operation history stored in the operation history storage unit 230 and the API execution history stored in the API execution history storage unit 240.

In Step S12, in response to a reception of a machining execution command inputted by an operator via the input unit (not shown) of the numerical control device 10, it is determined whether a start of operation for machining (cycle start) for the machine tool (not shown) has been detected. When the start of operation (cycle start) has been detected, the process proceeds to Step S13. On the other hand, when the start of operation (cycle start) has not been detected, the process waits in Step S12 until the start of operation is detected.

In Step S13, the to-be-saved data determination unit 130 determines, from among the data stored in the data storage unit 210, data that is to be saved in the saved data storage unit 220 by the data saving unit 140, based on a result of the determination by the API determination unit 120 or a designation inputted by the operator via the input unit (not shown) of the numerical control device 10.

In Step S14, the data saving unit 140 causes, from among the data stored in the data storage unit 210, data not for use for operation to be saved in the saved data storage unit 220. In a case where the saved data storage unit 220 does not have a sufficient free space, the data saving unit 140 preferentially causes the data determined in Step S13 to be saved in the saved data storage unit 220.

In Step S15, when the saving of the data in the saved data storage unit 220 in Step S14 is completed, the numerical control device 10 (the control unit 100) executes a machining program to start the operation for machining.

In Step S16, the operation status acquisition unit 150 determines whether an API executed by the information processing device 20 has accessed the numerical control device. If the API executed by the information processing device 20 has accessed the numerical control device, the process proceeds to Step S17. On the other hand, if the API executed by the information processing device 20 has not accessed the numerical control device, the process waits in Step S16 until an API executed by the information processing device 20 accesses the numerical control device.

In Step S17, the operation status acquisition unit 150 acquires an operation status of the numerical control device 10 (that is, a status in which the machining is in operation).

In Step S18 illustrated in FIG. 3, the API type determination unit 160 determines the type of the API that has been executed by the information processing device 20 and has accessed the numerical control device in Step S16.

In Step S19, the API type determination unit 160 determines whether or not the API determined in Step $18 is an API for parameter backup. When it is the API for parameter backup, the process proceeds to Step S20, On the other hand, when it is not the API for parameter backup, that is, when it is an API for parameter access that accesses (e.g., references to or changes) the parameters, the tool offsets, or the like set in the numerical control device 10 while the machining is in operation, the process proceeds to Step S22.

In Step S20, the saved data determination unit 170 determines whether or not the data, such as the parameters and the tool offsets set in the numerical control device 10, which the API for parameter backup is to access exists in the saved data storage unit 220. When the data exists in the saved data storage unit 220, the process proceeds to Step S21. On the other hand, when the data does not exist in the saved data storage unit 220, the process proceeds to Step S22.

In Step S21, the saved data determination unit 170 causes the API for parameter backup to access the saved data storage unit 220. The numerical control device 10 then ends the API processing.

In Step S22, the saved data determination unit 170 causes the API for parameter access to access the data storage unit 210. The numerical control device 10 then ends the API processing.

As described above, the numerical control device 10 according to the one embodiment saves, before a start of operation for machining, data that is accessed for a purpose different from the machining (data not for use for operation) in the saved data storage unit 220, so that the numerical control device 10 causes an API for backup to access the saved data storage unit 220 and causes an API for parameter access to access the data storage unit 210. Thus, the numerical control device 10 can suppress an access conflict between an API for backup that occupies data for a relatively long time and another API while the machine tool (not shown) is in operation, and can reduce the influence of the API for backup that occupies data for a relatively long time on the operation of the machine tool.

In other words, the numerical control device 10 generates to-be-saved data before a start of execution of a machining program to thereby increase the number of access destinations to two including the data storage unit 210 and the saved data storage unit 220. Thus, the numerical control device 10 makes it less likely for, for example, the operation and the API or at least two APIs for different processes to simultaneously access the same data while the machining is in operation, and makes it possible to reduce a state of waiting for interruption of exclusion when the data is to be accessed.

Furthermore, in the numerical control device 10, an API for accessing data necessary for the operation for machining is less likely to be made to wait, thereby making it possible to reduce deterioration of cycle time and stop of the operation.

It should be noted that the numerical control device 10 is not limited to the one embodiment described above, and includes modifications, improvements, and the like that are made within the range in which the object can be achieved.

Modification 1

In the one embodiment, the control system 1 includes one information processing device 20 connected to the numerical control device 10, but the present invention is not limited thereto. For example, two or more information processing devices 20 may be connected to the numerical control device 10.

Modification 2

For example, in the above-described embodiment, when an API executed by the information processing device 20 has accessed the numerical control device, the operation status acquisition unit 150 acquires an operation status of the numerical control device 10, but the present invention is not limited thereto. For example, the operation status acquisition unit 150 may have a function of causing an API from the information processing device 20 to access the data in the data storage unit 210 in a case where the acquired operation status does not indicate that the machining is in operation, and a function of causing the API from the information processing device 20 to access the data in the saved data storage unit 220 in a case where the acquired operation status indicates that the machining is in operation. In this case, the API type determination unit 160 and the saved data determination unit 170 may be omitted.

The functions included in the numerical control device 10 according to the one embodiment can be implemented by hardware, software, or a combination thereof. Here, the implementation by software means that a computer reads and executes a program for the implementation.

The program can be stored in various types of non-transitory computer readable media and can be provided to a computer. The non-transitory computer readable media include various types of tangible storage media. Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to the computer by way of various types of transitory computer readable media. Examples of the transitory computer readable media include an electrical signal, an optical signal, and an electromagnetic wave. The transitory computer readable medium can provide the program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the control device for an industrial machine according to the present disclosure can be implemented in various embodiments having the following configurations.

(1) The numerical control device 10 according to the present disclosure is a control device for an industrial machine, the control device being adapted for data access via an API, The numerical control device 10 includes the data storage unit 210 that stores data for use for operation, the saved data storage unit 220 that stores data not for use for operation, and a control unit 100. The control unit 100 includes the operation start detection unit 110 that detects a start of operation for machining for the industrial machine, the data saving unit 140 that causes data stored in the data storage unit 210 to be saved in the saved data storage unit 220, the operation status acquisition unit 150 that acquires an operation status of the numerical control device 10. The numerical control device 10 saves data in the saved data storage unit 220 before the start of operation for machining to thereby increase the number of access destinations to two including the data storage unit 210 and the saved data storage unit 220, and makes it less likely for the operation and the API or at least two APIs to simultaneously access the same data while the machining is in operation.

The numerical control device 10 having the above-described configuration makes it possible to suppress an access conflict between an API that occupies data for a relatively long time and another API while machining or the like of the industrial machine is in operation, and reduce the influence of the API that occupies data for a relatively long time on the operation of the industrial machine.

(2) In the numerical control device 10 described in (1), the control unit 100 may further include the API type determination unit 160 that determines the type of the API based on the information related to the API, and may cause the API to access the data storage unit 210 or the saved data storage unit 220 according to the type of the API.

(3) In the numerical control device 10 described in (1) or (2), the control unit 100 may further include the saved data determination unit 170 that determines whether or not data that the API is to access exists in the saved data storage unit 220, and the saved data determination unit 170 may cause the API to access the saved data storage unit 220 in a case where the data that the API is to access exists in the saved data storage unit 220, and cause the API to access the data storage unit 210 in a case where the data that the API is to access does not exist in the saved data storage unit 220.

(4) The numerical control device 10 described in any one of (1) to (3) may further include the operation history storage unit 230 that stores an operation history of the numerical control device 10 including at least the time of past machining, and the API execution history storage unit 240 that stores an API execution history including at least a type and an execution time of an API executed in the past. The control unit 100 may further include the API determination unit 120 that determines an API executed during past machining, based on the operation history stored in the operation history storage unit 230 and the API execution history stored in the API execution history storage unit 240.

(5) In the numerical control device 10 described in (4), the control unit 100 may further include the to-be-saved data determination unit 130 that determines, from among the data stored in the data storage unit 210, data that is to be saved in the saved data storage unit 220 by the data saving unit 140, based on the result of the determination by the API determination unit 120 or a designation by an operator, and may select the data to be saved in the saved data storage unit 220.

(6) In the numerical control device 10 described in (5), in a case where the saved data storage unit 220 does not have a sufficient free space, the data saving unit 140 may preferentially cause the data determined by the to-be-saved data determination unit 130 to be saved in the saved data storage unit 220.

EXPLANATION OF REFERENCE NUMERALS

1: Control system
10: Numerical control device
100: Control unit
110: Operation start detection unit
120: API determination unit
130: To-be-saved data determination unit
140; Data saving unit
150: Operation status acquisition unit
160: API type determination unit
170: Saved data determination unit
200: Storage unit
210: Data Storage unit
220: Saved data storage unit
230: Operation history storage unit
240: API execution history storage unit
20: Information processing device
21: API execution unit

The invention claimed is:

1. A control device for an industrial machine, the control device being adapted for data access via an API, and comprising:

a data storage unit configured to store data for use for operation;

a save-and-storage unit configured to store data not for use for operation; and a control unit, the control unit comprising an operation start detection unit configured to detect a start of operation for machining for the industrial machine, a data saving unit configured to cause data stored in the data storage unit to be saved in the save-and-storage unit, and an operation status acquisition unit configured to acquire an operation status of the control device, wherein the control device saves data in the save-and-storage unit before the start of the operation for machining to thereby increase a number of access destinations to two including the data storage unit and the save-and-storage unit, and makes it less likely for the operation and the API or at least two APIs to simultaneously access same data while the machining is in operation.

2. The control device according to claim 1, wherein the control unit further comprises an API type determination unit configured to determine a type of the API based on information related to the API, and the control unit causes the API to access the data storage unit or the save-and-storage unit according to the type of the API.

3. The control device according to claim 1, wherein the control unit further comprises a saved data determination unit configured to determine whether or not data that the API is to access exists in the save-and-storage unit, and the saved data determination unit causes the API to access the save-and-storage unit in a case where the data that the API is to access exists in the save-and-storage unit, and causes the API to access the data storage unit in a case where the data that the API is to access does not exist in the save-and-storage unit.

4. The control device according to claim 1, further comprising:

an operation history storage unit configured to store an operation history of the control device, the operation history including at least a time of past machining; and an API execution history storage unit configured to store an API execution history including at least a type and an execution time of an API executed in past, wherein the control unit further comprises an API determination unit configured to determine an API executed during past machining, based on the operation history stored in the operation history storage unit and the API execution history stored in the API execution history storage unit.

5. The control device according to claim 4, wherein the control unit further comprises a to-be-saved data determination unit configured to determine, from among the data stored in the data storage unit, data that is to be saved in the save-and-storage unit by the data saving unit, based on a result of determination by the API determination unit or a designation by an operator, and the control unit selects the data to be saved in the save-and-storage unit.

6. The control device according to claim 5, wherein in a case where the save-and-storage unit does not have a sufficient free space, the data saving unit preferentially causes the data determined by the to-be-saved data determination unit to be saved in the save-and-storage unit.

* * * * *